US012469468B2

(12) United States Patent
Tang et al.

(10) Patent No.: US 12,469,468 B2
(45) Date of Patent: Nov. 11, 2025

(54) METHOD OF ADJUSTING GRAYSCALES OF DISPLAY PANEL AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Xueqi Tang, Guangdong (CN); Zhongbin Wang, Guangdong (CN); Jhenwei He, Guangdong (CN); Yanxue Wang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/569,218

(22) PCT Filed: Oct. 12, 2023

(86) PCT No.: PCT/CN2023/124308
§ 371 (c)(1),
(2) Date: Dec. 12, 2023

(87) PCT Pub. No.: WO2024/198303
PCT Pub. Date: Oct. 3, 2024

(65) Prior Publication Data

US 2025/0087176 A1 Mar. 13, 2025

(30) Foreign Application Priority Data

Mar. 31, 2023 (CN) ......................... 202310363461.4

(51) Int. Cl.
*G09G 3/36* (2006.01)

(52) U.S. Cl.
CPC ... *G09G 3/3607* (2013.01); *G09G 2300/0452* (2013.01); *G09G 2320/028* (2013.01);
(Continued)

(58) Field of Classification Search
CPC ......... G09G 3/3607; G09G 2300/0452; G09G 2320/028; G09G 2320/0673
See application file for complete search history.

(56) References Cited

U.S. PATENT DOCUMENTS

2017/0206821 A1* 7/2017 Lee ...................... G09G 3/3688
2022/0139298 A1* 5/2022 Park ..................... G09G 3/3233
345/76

* cited by examiner

*Primary Examiner* — Kwang-Su Yang
(74) *Attorney, Agent, or Firm* — PV IP PC; Wei Te Chung

(57) ABSTRACT

A method for adjusting grayscales of a display panel and a display panel, wherein firstly obtaining a reference brightness corresponding to each original grayscale according to each original grayscale, then filtering an initial dataset to obtain a preliminary dataset, calculating a weight of a preset brightness according to a front-viewing weight and the reference brightness, and finally selecting a group of grayscale data corresponding to the preset brightness with the smallest weight as a target high grayscale and a target low grayscale. The present disclosure can increase visual angles of the display panel and solve visual angle defects.

20 Claims, 7 Drawing Sheets

(52) U.S. Cl.
CPC ............... *G09G 2320/0673* (2013.01); *G09G 2320/068* (2013.01)

METHOD OF ADJUSTING GRAYSCALES OF DISPLAY PANEL AND DISPLAY PANEL

CROSS REFERENCE TO RELATED APPLICATIONS

This application is a US national phase application based upon an International Application No. PCT/CN2023/124308, filed on Oct. 12, 2023, which claims the priority of Chinese Patent Application No. 202310363461.4, entitled "METHOD OF ADJUSTING GRAYSCALES OF DISPLAY PANEL AND DISPLAY PANEL", filed on Mar. 31, 2023, the disclosures of which are incorporated herein by reference in its entirety.

FIELD OF INVENTION

The present disclosure relates to a field of display technology, specifically to a method for adjusting grayscales of a display panel and a display panel.

BACKGROUND

A Liquid crystal display (LCD) usually uses a light transmission mechanism. When a light is emitted forward through liquid crystals at a near-vertical angle, the best visual effect can be achieved by looking directly at it. When a viewing angle changes, an angle at which the light enters human eyes also changes, so that a display screen appears whitening and color washout. When the viewing angle exceeds a critical angle, display content is not visible to the human eyes.

However, with development of display technology, application scenarios of large-size products are becoming increasingly widespread. For large-size display panels, visual angle defects are inevitable. Therefore, how to increase a visual angle of a display panel and solve visual angle defects is a technical problem that needs to be solved urgently.

SUMMARY

The present disclosure provides a method for adjusting grayscales of a display panel and a display panel to increase a visual angle of the display panel, solve visual angle defects, and improve a display effect.

The present disclosure provides a method for adjusting grayscales of a display panel, comprising:

S1: obtaining a plurality of initial high grayscales and a plurality of initial low grayscale corresponding to a plurality of original grayscales;

S2: obtaining a plurality of reference brightnesses corresponding to the original grayscales according to the initial high grayscales and the initial low grayscales;

S3: setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale;

S4: selecting at least a part of the original grayscales as binding-point grayscales and setting a high grayscale threshold and a front-viewing weight corresponding to each binding-point grayscale;

S5: filtering the initial dataset according to the high grayscale thresholds, the initial high grayscales, and the initial low grayscale to obtain a preliminary dataset;

S6: calculating a weight of the preset brightness corresponding to each original grayscale in the preliminary dataset according to the front-viewing weight and the reference brightness; and S7: for one same original grayscale, selecting one group of grayscale data corresponding to the preset brightness with the smallest weight as the target high grayscale and the target low grayscale of the original grayscale.

Optionally, in some embodiment of the present disclosure, step S1 comprises:

obtaining the initial high grayscale and the initial low grayscale corresponding to each original grayscale according to a front-viewing gamma curve and a side-viewing gamma curve of subpixels of each color of the display panel.

Optionally, in some embodiment of the present disclosure, step S5 comprises:

comparing the groups of grayscale data corresponding to each original grayscale with the initial high grayscale and the initial low grayscale, wherein if in one same group of grayscale data, the preset high grayscale is greater than the initial high grayscale, a difference between the preset high grayscale and the initial high grayscale is less than the high grayscale threshold, and the preset low grayscale is less than the initial low grayscale, the group of grayscale data is retained in the preliminary dataset; otherwise, the group of grayscale data is filtered out.

Optionally, in some embodiment of the present disclosure, the reference brightness comprises a front-viewing reference brightness and a side-viewing reference brightness, the preset brightness comprises a front-viewing preset brightness and a side-viewing preset brightness, and in step S6, the weight of the preset brightness is calculated as: $K=a\times|L3-L1|+(1-a)\times|L4-L2|$;

where K represents the weight of the preset brightness, a represents the front-viewing weight, L3 represents the front-viewing preset brightness, L1 represents the front-viewing reference brightness, LA represents the side-viewing preset brightness, and L2 represents the side-viewing reference brightness.

Optionally, in some embodiment of the present disclosure, the binding-point grayscales comprise a first binding-point grayscale and a second binding-point grayscale, the second binding-point grayscale is greater than the first binding-point grayscale, and a high grayscale threshold corresponding to the second binding-point grayscale is greater than a high grayscale threshold corresponding to the first binding-point grayscale.

Optionally, in some embodiment of the present disclosure, step S4 further comprises:

obtaining a high grayscale threshold and a front-viewing weight corresponding to each original grayscale except the binding-point grayscales through interpolation.

Optionally, in some embodiment of the present disclosure, step S7 further comprises:

setting a first preset grayscale, wherein if an Nth original grayscale is greater than the first preset grayscale, a target high grayscale corresponding to the Nth original grayscale is greater than a target high grayscale corresponding to an N-1th original grayscale and less than the target high grayscale corresponding to the N-1th original grayscale plus one, and a difference between a grayscale value of the Nth original grayscale and a grayscale value of the N-1th original grayscale is one.

Optionally, in some embodiment of the present disclosure, the first preset grayscale is greater than or equal to 150.

Optionally, in some embodiment of the present disclosure, the step S7 further comprises:

setting a second preset grayscale, wherein if an Nth original grayscale is greater than the second preset grayscale, a target low grayscale corresponding to the Nth original grayscale is greater than a target low grayscale corresponding to an N-1th original grayscale and less than the highest grayscale among the original grayscales.

Optionally, in some embodiment of the present disclosure, the step S1 further comprises:

correcting the initial high grayscale and the initial low grayscale corresponding to each original grayscale so that the initial high grayscale corresponding to each original grayscale is greater than the initial low grayscale corresponding to each original grayscale.

Optionally, in some embodiment of the present disclosure, in the target grayscale arrangement, in the display panel, a ratio of a number of subpixels displayed in the preset high grayscales to a number of subpixels displayed in the preset low grayscales is 1:1, 1:2, or 1:3.

Correspondingly, the present disclosure further provides a display panel using the method for adjusting grayscales of the display panel to obtain a target high grayscale and a target low grayscale corresponding to an original grayscale.

Advantageous Effect

The present disclosure provides a method for adjusting grayscales of a display panel and a display panel. The method for adjusting grayscales of the display panel includes: S1: obtaining a plurality of initial high grayscales and a plurality of initial low grayscale corresponding to a plurality of original grayscales; S2: obtaining a plurality of reference brightnesses corresponding to the original grayscales according to the initial high grayscales and the initial low grayscales; S3: setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale; S4: selecting at least a part of the original grayscales as binding-point grayscales and setting a high grayscale threshold and a front-viewing weight corresponding to each binding-point grayscale; S5: filtering the initial dataset according to the high grayscale thresholds, the initial high grayscales, and the initial low grayscale to obtain a preliminary dataset; S6: calculating a weight of the preset brightness corresponding to each original grayscale in the preliminary dataset according to the front-viewing weight and the reference brightness; and S7: for one same original grayscale, selecting one group of grayscale data corresponding to the preset brightness with the smallest weight as the target high grayscale and the target low grayscale of the original grayscale. In the present disclosure, through the above method for adjusting the grayscales, under any set target grayscale arrangement, a target high grayscale and a target low grayscale corresponding to an original grayscale can be obtained based on an initial high grayscale and an initial low grayscale corresponding to the original grayscale, thereby increasing visual angles of the display panel, solving visual angle defects, and improving display effects.

DETAILED DESCRIPTION OF PREFERRED EMBODIMENTS

In order to make the purpose, technical solutions and effects of the present disclosure clearer and clearer, the present disclosure will be further described in detail below with reference to the accompanying drawings and examples. It should be understood that the specific embodiments described here are only used to explain the present disclosure and are not used to limit the present disclosure.

This present disclosure provides a method for adjusting grayscales of a display panel and a display panel, which will be described in detail below. It should be noted that the description order of the following embodiments does not limit the preferred order of the embodiments of the present disclosure.

Figure 1:
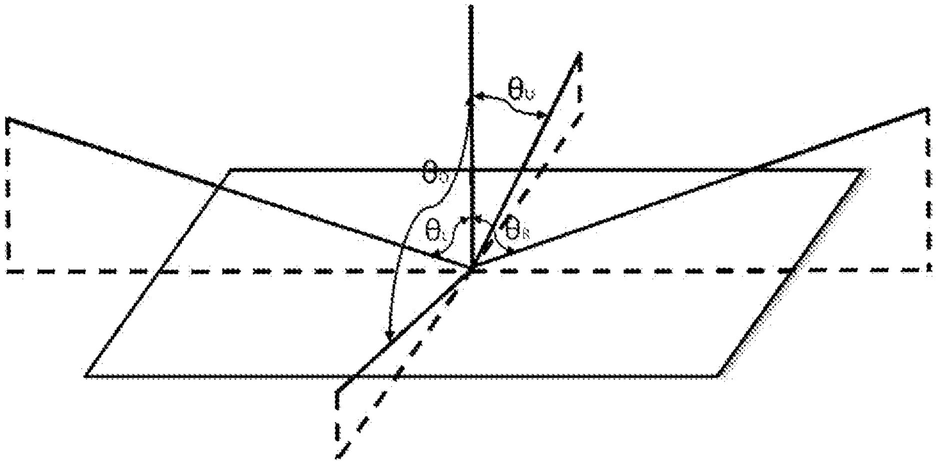
FIG. 1 is a schematic diagram of visual angles of a display panel according to the present disclosure.

Please refer to FIG. 1. FIG. 1 is a schematic diagram of visual angles of a display panel according to the present disclosure. A critical angle is called a visual angle. $\theta_U$ and $\theta_D$ are vertical visual angles of the display panel. $\theta_L$ and $\theta_R$ are horizontal visual angles of the display panel. When a viewing angle exceeds the vertical visual angles or the horizontal visual angles, a display screen of the display panel is not visible to human eyes.

Specifically, the visual angle refers to a visual angle that meets two visual requirements of a contrast ratio of 10:1 and no grayscale inversion. The visual angle is one of important indicators for evaluating performance of the display panel. The contrast ratio objectively refers to a ratio of a maximum brightness to a minimum brightness of the display screen of the display panel. The grayscale inversion objectively means that a brightness of the display panel when displaying low grayscale is higher than a brightness when displaying high grayscale.

Figure 2:
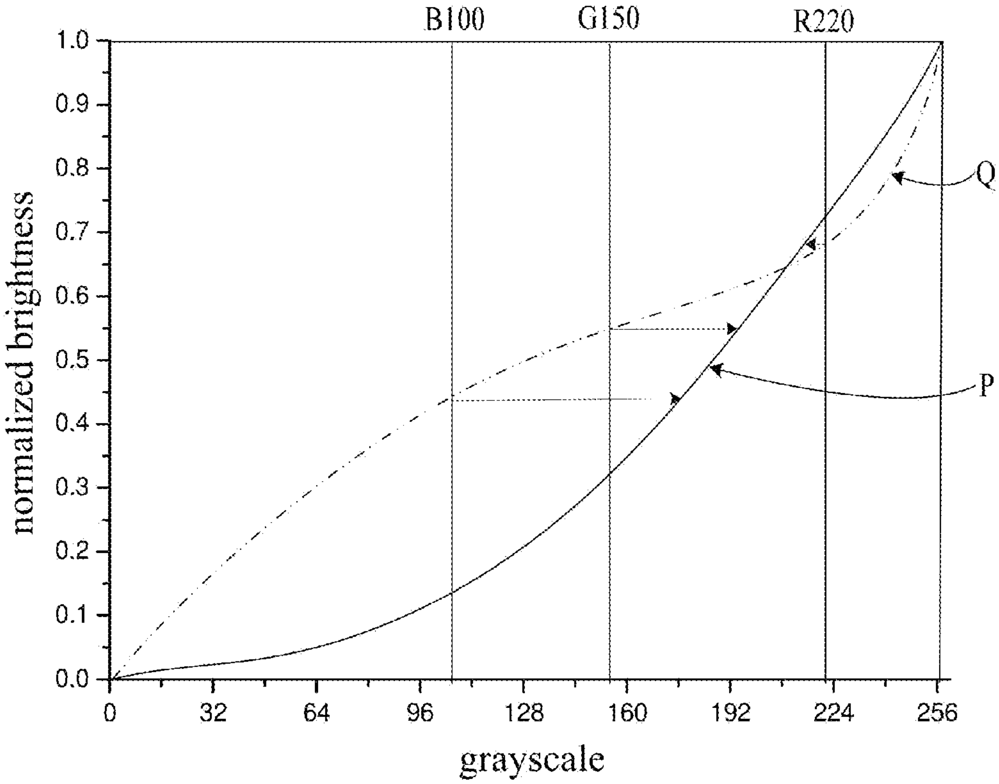
FIG. 2 is a schematic diagram of gamma curves of the display panel before visual angle compensation according to the present disclosure.

After research, a cause of visual angle defects is that a side-viewing gamma curve of the display panel deviates from a front-viewing gamma curve of the display panel. Please refer to FIG. 2. FIG. 2 is a schematic diagram of gamma curves of the display panel before visual angle compensation according to the present disclosure.

A curve P represents the front-viewing gamma curve, and a curve Q represents the side-viewing gamma curve. Comparing an initial front-viewing gamma curve P and an initial side-viewing gamma curve Q, taking a common skin color of Asians as an example, in the display panel, original grayscale values of three primary colors (RGB) measured when looking at a skin color screen from the front are R=220, G=150, and B=100, and original grayscale values of RGB measured when looking at the skin color screen are R=215, G=192, and B=176. It can be understood that for one same display screen, when viewed from the front and the side, the original grayscale values of RGB change and the gamma curve shifts, resulting in color shift, and poor display effect when viewed from the side.

In order to solve a problem of the aforementioned visual angle defects, in the related art, an original grayscale of a subpixel in an active display area of the display panel is replaced with a relatively high grayscale and a relatively low grayscale. An average value of a brightness corresponding to the relatively high grayscale and a brightness corresponding to the relatively low grayscale is substantially equal to a brightness corresponding to the original grayscale. When viewed from the side, the subpixel with low grayscale will reduce brightness change when viewed from the side, which can improve a display effect when viewed from the side.

Figure 3:
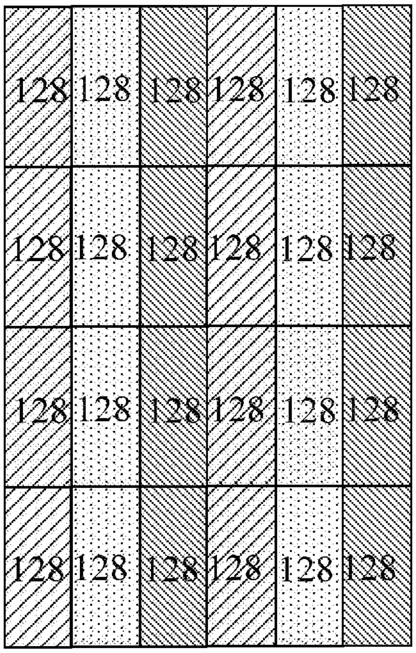
FIG. 3 is a schematic diagram of a structure of the display panel before the visual angle compensation according to the present disclosure.
Figure 4:
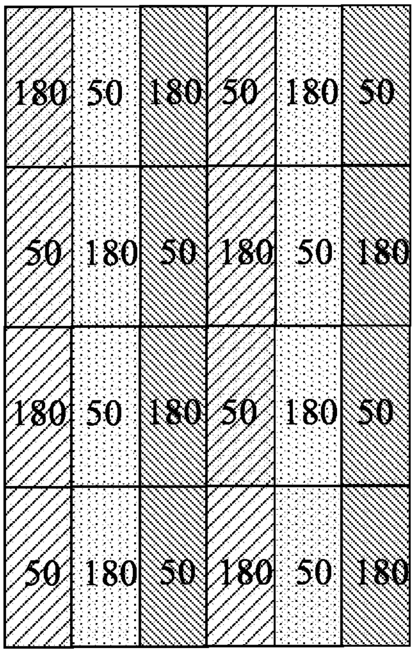
FIG. 4 is a schematic diagram of a structure of the display panel after the visual angle compensation according to the present disclosure.
Figure 5:
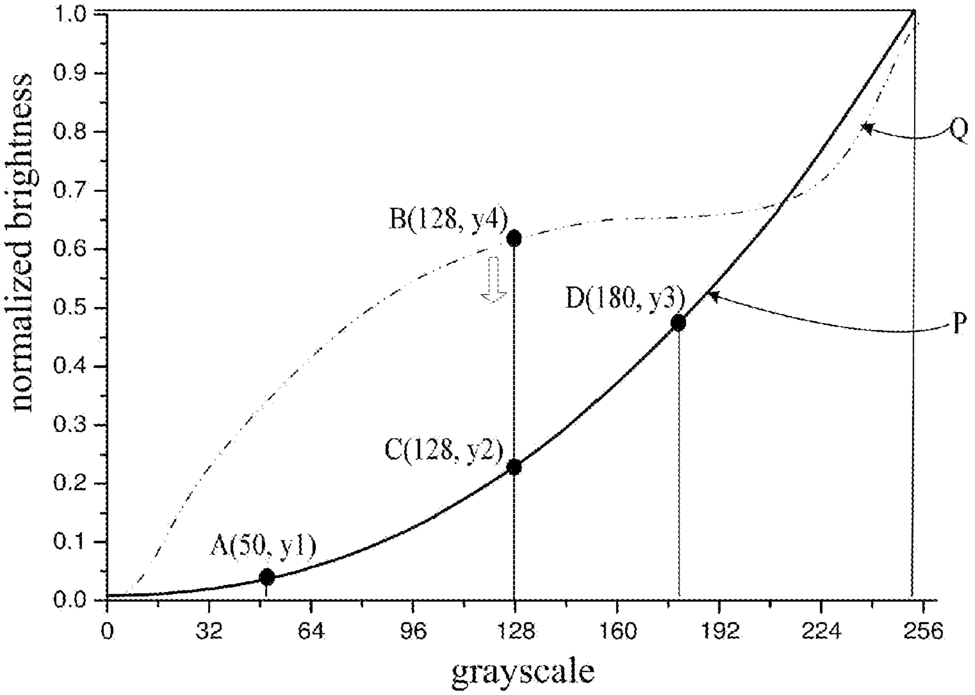
FIG. 5 is a schematic diagram of gamma curves of the display panel after the angle of view compensation according to the present disclosure.

Specifically, please refer to FIG. 3 to FIG. 5. FIG. 3 is a schematic diagram of a structure of the display panel before the visual angle compensation according to the present disclosure. FIG. 4 is a schematic diagram of a structure of the display panel after the visual angle compensation according to the present disclosure. FIG. 5 is a schematic diagram of gamma curves of the display panel after the angle of view compensation according to the present disclosure.

Taking an original grayscale 128 as an example, the original grayscale 128 is replaced with a high grayscale 180 and a low grayscale 50. Please refer to points A, B, C, and D in FIGS. 5, y1, y2, and y3 respectively represent front-viewing brightnesses corresponding to the low grayscale 50, the original grayscale 128, and the high grayscale 180, and y4 represents a side-viewing brightness corresponding to the original grayscale 128. When replacing an original grayscale with a high grayscale and a low grayscale, a side-viewing brightness change will be reduced. Therefore, the side-viewing gamma curve Q that deviates from the front-viewing gamma curve P will be closer to the front-viewing gamma curve P, thereby improving a side-viewing display effect and increasing the visual angles of the display panel.

However, for different grayscale arrangements in different models or one same mode, the high grayscale and the low grayscale corresponding to one same original grayscale may be different. In different grayscale arrangements of the display panel, if each original grayscale corresponds to one same high grayscale and one same low grayscale, it may result in poor visual angle improvement. In this regard, the present disclosure provides a method for adjusting grayscales of a display panel, which can obtain a target high grayscale and a target low grayscale corresponding to an original grayscale.

Specifically, the method for adjusting grayscales of the display panel includes: obtaining a plurality of initial high grayscales and a plurality of initial low grayscale corresponding to a plurality of original grayscales; obtaining a plurality of reference brightnesses corresponding to the original grayscales according to the initial high grayscales and the initial low grayscales; setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale; selecting at least a part of the original grayscales as binding-point grayscales and setting a high grayscale threshold and a front-viewing weight corresponding to each binding-point grayscale; filtering the initial dataset according to the high grayscale thresholds, the initial high grayscales, and the initial low grayscale to obtain a preliminary dataset; calculating a weight of the preset brightness corresponding to each original grayscale in the preliminary dataset according to the front-viewing weight and the reference brightness; and for one same original grayscale, selecting one group of grayscale data corresponding to the preset brightness with the smallest weight as the target high grayscale and the target low grayscale of the original grayscale.

In an embodiment of the present disclosure, through the method for adjusting the grayscales of the display panel, under any set target grayscale arrangement, a target high grayscale and a target low grayscale corresponding to an original grayscale can be obtained based on an initial high grayscale and an initial low grayscale corresponding to the original grayscale, thereby increasing the visual angles of the display panel, solving the visual angle defects, and improving the display effect.

Definitions of the original grayscale, the high grayscale, and the low grayscale can be referred to the above embodiment, and will not be described in detail herein.

Detailed introduction is described below.

Figure 6:
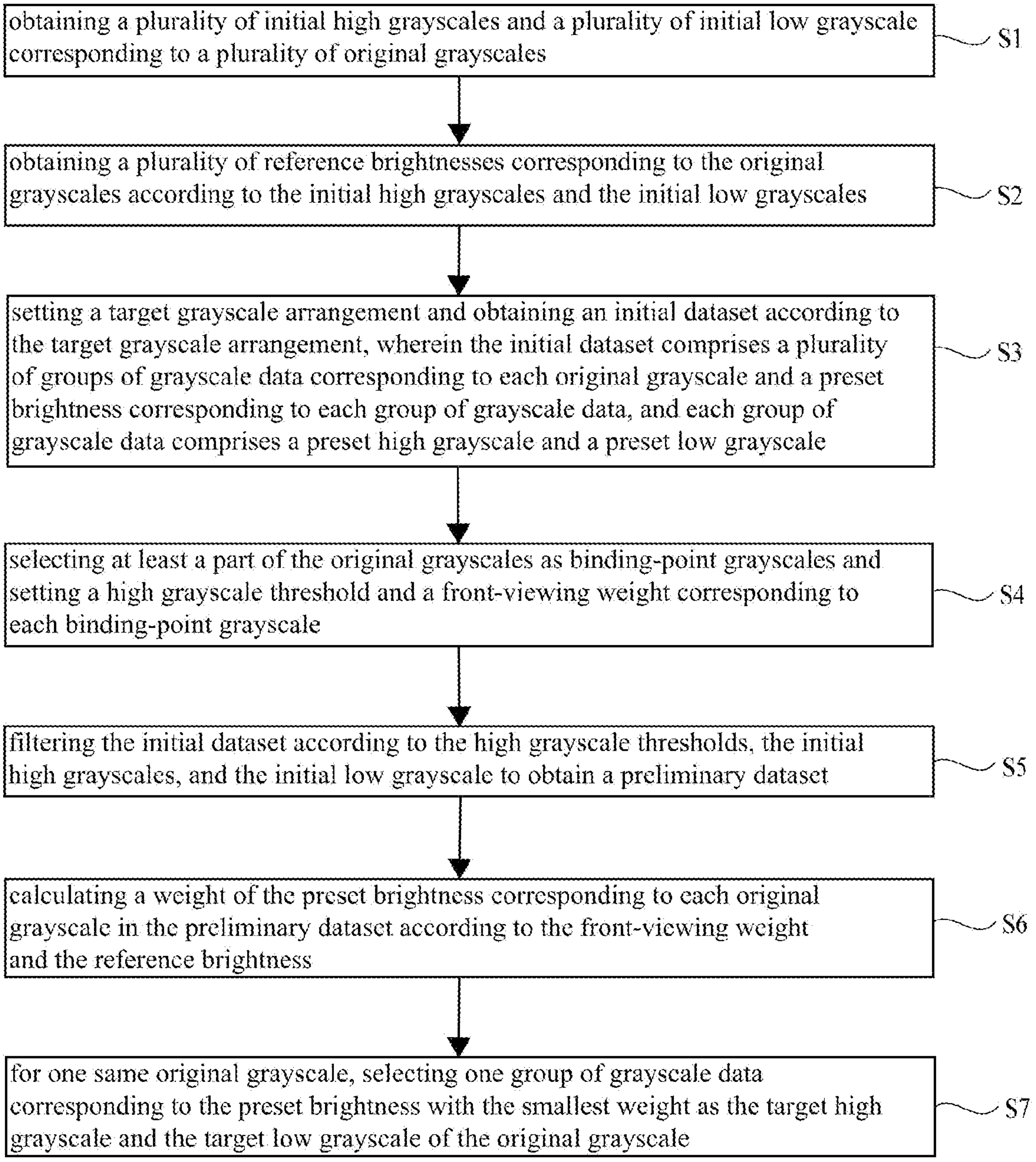
FIG. 6 is a schematic flowchart of a method for adjusting grayscales of the display panel according to the present disclosure.

Please refer to FIG. 6. FIG. 6 is a schematic flowchart of a method for adjusting grayscales of the display panel according to the present disclosure. The method comprises the following steps.

S1: obtaining a plurality of initial high grayscales and a plurality of initial low grayscale corresponding to a plurality of original grayscales.

Specifically, each original grayscale corresponds to one initial high grayscale and one initial low grayscale. For one same original grayscale, the initial high grayscale is greater than the initial low grayscale.

For example, if image display data input to the display panel is a binary 8-bit, $2^8$ brightnesses from the darkest to the brightest will be generated. That is, 256 grayscales with different brightness are generated (for example, denoted as 0th grayscale to 255th grayscale). Any grayscale from the 0th grayscale to the 255th grayscale may be called the original grayscale. Each original grayscale corresponds to one initial high grayscale and one initial low grayscale. Of course, the image display data received by the display panel of the present disclosure may be binary 6 bits, binary 10 bits, etc.

Step S1 may comprise:

obtaining the initial high grayscale and the initial low grayscale corresponding to each original grayscale according to a front-viewing gamma curve and a side-viewing gamma curve of subpixels of each color of the display panel.

For example, the display panel comprises four color subpixels: red subpixels, green subpixels, blue subpixels, and white subpixels (RGBW). When the subpixels of each color are displayed, a corresponding front-viewing gamma curve and a corresponding side-viewing gamma curve can be obtained through testing. Then, according to the front-viewing gamma curve and the side-viewing gamma curve of the subpixels of each color, each original grayscale is adjusted to obtain the initial high grayscale and the initial low grayscale corresponding to each original grayscale.

It is noted that obtaining an initial high grayscale and an initial low grayscale corresponding to each original grayscale according to a front-viewing gamma curve and a side-viewing gamma curve is a technique well known to those skilled in the art, and will not be described in detail herein. Of course, in the embodiment of the present disclosure, the initial high grayscale and the initial low grayscale corresponding to each original grayscale may be obtained according to any related technology, which will not be described in detail herein.

In addition, the display panel may comprise three color subpixels (RGB), which is not specifically limited in the present disclosure.

Step S1 may further comprise:

correcting the initial high grayscale and the initial low grayscale corresponding to each original grayscale so that the initial high grayscale corresponding to each original grayscale is greater than the initial low grayscale corresponding to each original grayscale.

It is noted that, in some methods of obtaining an initial high grayscale and an initial low grayscale, for one same original grayscale, the initial high grayscale finally obtained may be less than the initial low grayscale finally obtained. For one same original grayscale, when the initial high grayscale is less than the initial low grayscale, display distortion may occur.

Therefore, in the embodiment of the present disclosure, after obtaining the initial high grayscales and the initial low grayscales corresponding to the original grayscales, the initial high grayscale and the initial low grayscale of each original grayscale can be compared. When it is found that the initial high grayscale is less than the initial low grayscale, the initial high grayscale or the initial low grayscale is adjusted to ensure that for one same original grayscale, the initial high grayscale is greater than the initial low grayscale, thereby avoiding display distortion.

S2: obtaining a plurality of reference brightnesses corresponding to the original grayscales according to the initial high grayscales and the initial low grayscales.

For example, when the image display data of the display panel is binary 8 bits, the display panel has 256 original grayscales. For each original grayscale, each subpixel of the display panel may be displayed with the initial high grayscale or the initial low grayscale corresponding to the original grayscale, and then the reference brightness corresponding to the original grayscale can be obtained through testing. That is, display brightnesses of all grayscales of the display panel are obtained.

The reference brightness corresponding to each original grayscale comprises a front-viewing reference brightness and a side-viewing reference brightness.

Specifically, reference brightness data of the display panel may be collected by instruments such as CA310 color analyzer and SRUL2 spectroradiometer.

It is noted that after the reference brightness data of the display panel is collected, the reference brightness data may be normalized. That is, the reference brightness corresponding to each original grayscale is a normalized brightness, which reduces complexity of subsequent data processing.

S3: setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale.

The target grayscale arrangement may refer to a ratio of a number of subpixels displayed in high grayscales to a number of subpixels displayed in low grayscales in the display panel, or an arrangement of the subpixels displayed in high grayscales and low grayscales in the display panel.

For example, in the display panel, the ratio of the number of the subpixels displayed in the high grayscales to the number of the subpixels displayed in the low grayscales is different, but the arrangement of the subpixels displayed in the high grayscales and the low grayscales is same. Alternatively, in the display panel, the arrangement of the subpixels displayed in the high grayscales and the low grayscales is different, but the ratio of the number of the subpixels displayed in the high grayscales to the number of the subpixels displayed in the low grayscales is same. The above situations may be regarded as different target grayscale arrangements of the display panel.

For example, for the subpixels of one same color, the ratio of the number of the subpixels displayed in the high grayscales to the number of the subpixels displayed in the low grayscales may be 1:1, 1:2, 1:3, etc., which is not specifically limited in the present disclosure. The higher the proportion of the number of the subpixels displayed in the low grayscales, the smaller the difference between a side-viewing brightness and a front-viewing brightness, and the better the improvement of the visual angles.

One same preset low grayscale may comprise 2 preset low sub-grayscales. That is, each original grayscale is replaced with 1 high grayscale and 2 low grayscales. One same preset low grayscale may comprise 3 preset low sub-grayscales. That is, each original grayscale is replaced with 1 high grayscale and 3 low grayscales. which is not specifically limited in the present disclosure.

When the target grayscale arrangement is determined, for each original grayscale, a plurality of groups of grayscale data may be set. Each group of grayscale data comprises one preset high grayscale and one preset low grayscale.

For example, when the original grayscale is 80, in a first group of grayscale data, a preset high grayscale may be set to 120, and a preset low grayscale may be set to 60; in a second group of grayscale data, a preset high grayscale may be set to 120, and a preset low grayscale may be set to 50; and in a third group of grayscale data, a preset high grayscale may be set to 140, and a preset low grayscale may be set to 60. By analogy, in an embodiment, if the display panel has 256 original grayscales, then 256*256 groups of grayscale data may be set corresponding to all original grayscales, which will not be described in detail herein.

For another example, when the original grayscale is 80, in a first group of grayscale data, a preset high grayscale may be set to 120, and a preset low grayscale comprises two preset low sub-grayscales, which are 50 and 60; in a second group of grayscale data, a preset high grayscale may be set to 120, and a preset low grayscale comprises 40 and 30; and in a third group of grayscale data, a preset high grayscale may be set to 140, and a preset low grayscale comprises 50 and 60, which are not described in detail herein.

Then, each subpixel of the display panel may be displayed with one group of grayscale data corresponding to the original grayscale, and then the preset brightness corresponding to the group of grayscale data can be obtained through testing.

Similarly, in some embodiments of the present disclosure, after the preset brightness data of the display panel is collected, the preset brightness data may be normalized. That is, the preset brightness corresponding to each group of grayscale data is a normalized brightness, which reduces the complexity of the subsequent data processing.

The preset brightness comprises a front-viewing preset brightness and a side-viewing preset brightness.

S4: selecting at least a part of the original grayscales as binding-point grayscales and setting a high grayscale threshold and a front-viewing weight corresponding to each binding-point grayscale.

The high grayscale threshold refers to the maximum difference between the preset high grayscale corresponding to the original grayscale and the original grayscale. For example, if the high grayscale threshold of the original grayscale 0 is 2, the preset high grayscale corresponding to the original grayscale 0 can only be grayscale 2 at most.

For example, if the display panel has 256 original grayscales, 33 original grayscales may be selected as binding-point grayscales, of course, the present disclosure is not limited to this. In some embodiments, 20 original grayscales, 50 original grayscales, 60 original grayscales, etc. may also be selected as binding-point grayscales. It is understandable that the greater the number of binding-point grayscales., the better the grayscale adjusting effect of the display panel.

Each binding-point grayscale corresponds to a side-viewing weight. A sum of the front-viewing weight and the side-viewing weight is 1. The front-viewing weight and the side-viewing weight are used to balance shapes of the front-viewing gamma curve and the side-viewing gamma curve after grayscale adjustment, so as to minimize deviation of the side-viewing gamma curve from the front-viewing gamma curve while ensuring that the front-viewing gamma curve is basically unchanged. If the side-viewing gamma curve moves downward too much, the front-viewing gamma curve may shift, affecting a front-viewing effect. The greater the front-viewing weight, the smaller the deviation of the front-viewing gamma curve before and after the grayscale adjustment.

Normally, the front-viewing weight and the side-viewing weight may be set to 0.5. Of course, in an embodiment of the present disclosure, the front-viewing weight and the side-viewing weight may be adjusted according to final adjusted grayscales.

The high grayscale threshold may be adjusted according to needs of an actual operation process.

In some embodiments of the present disclosure, the binding-point grayscales comprise a first binding-point grayscale and a second binding-point grayscale. The second binding-point grayscale is greater than the first binding-point grayscale. A high grayscale threshold corresponding to the second binding-point grayscale is greater than a high grayscale threshold corresponding to the first binding-point grayscale.

For example, if a high grayscale threshold corresponding to the original grayscale 0 is 2, a high grayscale threshold corresponding to the original grayscale 1 should be greater than 2, so that high and low grayscale curves corresponding to the original grayscales obtained after grayscale adjustment will be smoother, thereby avoiding distortions.

In some embodiments of the present disclosure, step S4 further comprises:

obtaining a high grayscale threshold and a front-viewing weight corresponding to each original grayscale except the binding-point grayscales through interpolation.

It can be understood that in step S4, only part of the original grayscales is selected as the binding-point grayscales. Therefore, the high grayscale threshold and the front-viewing weight corresponding to each original grayscale except the binding-point grayscales may be obtained through interpolation. This facilitates subsequent steps S5-S7 for each original grayscale, thereby improving accuracy of grayscale adjustment.

S5: filtering the initial dataset according to the high grayscale thresholds, the initial high grayscales, and the initial low grayscale to obtain a preliminary dataset.

Specifically, in some embodiments of the present disclosure, step S5 comprises:

comparing the groups of grayscale data corresponding to each original grayscale with the initial high grayscale and the initial low grayscale, wherein if in one same group of grayscale data, the preset high grayscale is greater than the initial high grayscale, a difference between the preset high grayscale and the initial high grayscale is less than the high grayscale threshold, and the preset low grayscale is less than the initial low grayscale, the group of grayscale data is retained in the preliminary dataset; otherwise, the group of grayscale data is filtered out.

The preliminary dataset comprises the groups of grayscale data that meet the above filtering conditions, and further comprises the preset brightnesses corresponding to the groups of grayscale data that meet the above filtering conditions.

In the embodiment of the present disclosure, only groups of grayscale data are selected in which the preset high grayscale is greater than the initial high grayscale, and the preset low grayscale is less than the initial low grayscale. This can further increase the difference between the relatively high grayscale and the relatively low grayscale corresponding to the original grayscale, thereby further increasing the visual angles of the display panel and improving a visual angle improvement effect.

In addition, for one original grayscale, the embodiment of the present disclosure limits the difference between the preset high grayscale and the initial high grayscale to be less than the high grayscale threshold, which can reduce the increase in the preset high grayscale. This prevents the preset high grayscales corresponding to medium and high grayscales in the original grayscales from all being the highest grayscale.

S6: calculating a weight of the preset brightness corresponding to each original grayscale in the preliminary dataset according to the front-viewing weight and the reference brightness.

Specifically, the reference brightness comprises a front-viewing reference brightness and a side-viewing reference brightness. The preset brightness comprises a front-viewing preset brightness and a side-viewing preset brightness. In step S6, the weight of the preset brightness is calculated as: $K=a\times|L3-L1|+(1-a)\times|L4-L2|$.

K represents the weight of the preset brightness, a represents the front-viewing weight, L3 represents the front-viewing preset brightness, L1 represents the front-viewing reference brightness, L4 represents the side-viewing preset brightness, and L2 represents the side-viewing reference brightness.

S7: for one same original grayscale, selecting one group of grayscale data corresponding to the preset brightness with the smallest weight as the target high grayscale and the target low grayscale of the original grayscale.

The preset high grayscale in the group of grayscale data is used as the target high grayscale corresponding to the original grayscale. The preset low grayscale in the group of grayscale data is used as the target low grayscale corresponding to the original grayscale.

It can be understood that for each original grayscale, there may be one or more groups of grayscale data that satisfy the filtering conditions of step S5, or there may be no group of grayscale data that satisfies the filtering conditions of step S5.

When only one group of grayscale data satisfies the filtering conditions of step S5, there is only one weight calculated through step S6, so this group of grayscale data is used as the target high grayscale and target low grayscale corresponding to the original grayscale.

When multiple groups of grayscale data satisfy the filtering conditions of step S5, there are multiple weights calculated through step S6, then one group of grayscale data corresponding to the preset brightness with the smallest weight is selected as the target high grayscale and the target low grayscale of the original grayscale.

When no group of grayscale data satisfies the filtering conditions of step S5, the initial high grayscale and initial low grayscale corresponding to the original grayscale are retained as the target high grayscale and target low grayscale corresponding to the original grayscale.

In some embodiments of the present disclosure, step S7 further comprises:

setting a first preset grayscale, wherein if an Nth original grayscale is greater than the first preset grayscale, a target high grayscale corresponding to the Nth original grayscale is greater than a target high grayscale corresponding to an N-1th original grayscale and less than the target high grayscale corresponding to the N-1th original grayscale plus one, and a difference between a grayscale value of the Nth original grayscale and a grayscale value of the N-1th original grayscale is one.

For example, if the first preset grayscale is 160. The Nth original grayscale is the original grayscale 165. The N-1th original grayscale is the original grayscale 164. If the target high grayscale corresponding to the original grayscale 164 is 180, the target high grayscale corresponding to the original grayscale 165 needs to be greater than 180 and less than 181.

The embodiment of the present disclosure can further prevent the target high grayscale values corresponding to the medium and high grayscales in the original grayscales from increasing too quickly.

In some embodiments of the present disclosure, step S7 further comprises:

setting a second preset grayscale, wherein if the Nth original grayscale is greater than the second preset grayscale, a target low grayscale corresponding to the Nth original grayscale is greater than a target low grayscale corresponding to the N-1th original grayscale and less than the highest grayscale among the original grayscales.

For example, when the image display data of the display panel is binary 8 bits, the maximum grayscale of the display panel is 255. Therefore, the target low grayscale corresponding to the Nth original grayscale is greater than the target low grayscale corresponding to the N-1th original grayscale and less than 255.

The embodiment of the present disclosure can make the obtained target low grayscales corresponding to the original grayscales smoother, thereby improving display effects.

In some embodiments of the present disclosure, when the image display data of the display panel is binary 8 bits, the first preset grayscale and the second preset grayscale may be greater than or equal to 150. For example, the first preset grayscale and the second preset grayscale may be 150, 160, 180, 200, and so on.

Figure 7:
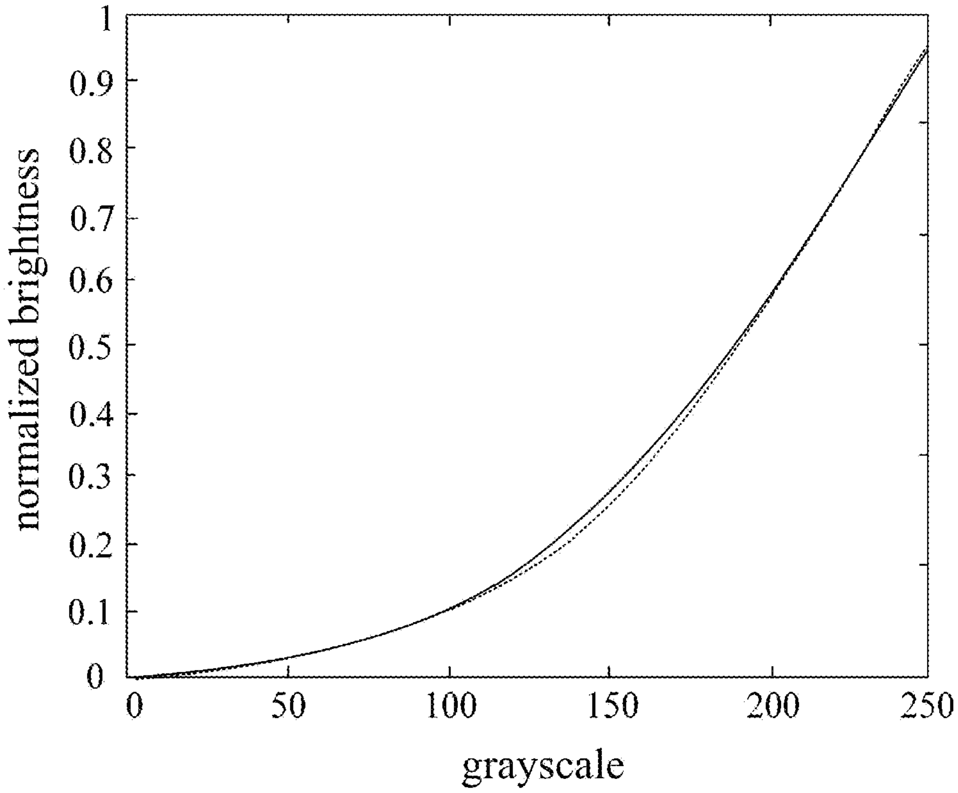
FIG. 7 shows front-viewing gamma curves of the display panel before and after the visual angle compensation according to the present disclosure.
Figure 8:
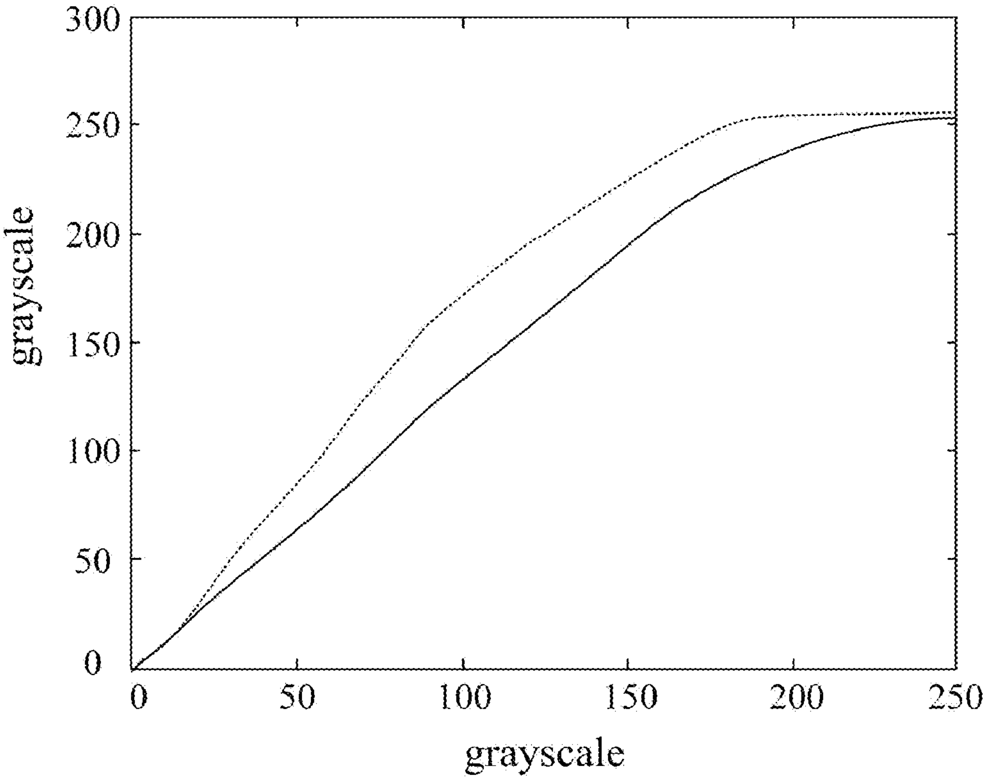
FIG. 8 is a schematic diagram of target high grayscales and initial high grayscales according to the present disclosure.
Figure 9:
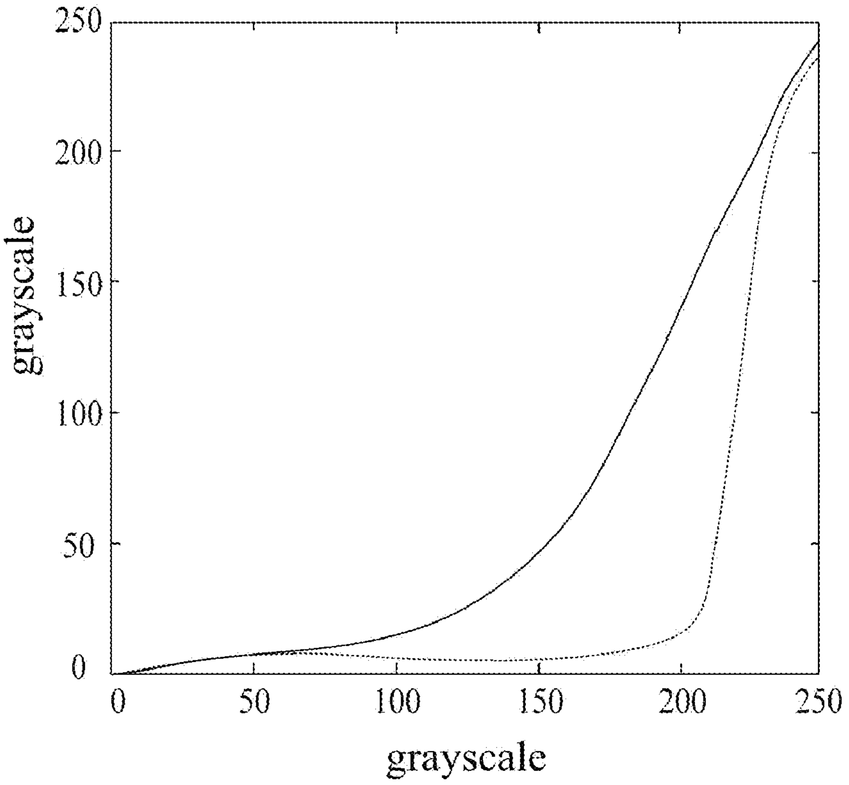
FIG. 9 is a schematic diagram of target low grayscales and initial low grayscales according to the present disclosure.

Furthermore, please refer to FIG. 7 to FIG. 9. As shown in FIG. 7, a solid line represents a front-viewing gamma curve of the display panel before the visual angle compensation, and a dotted line represents a front-viewing gamma curve of the display panel after the visual angle compensation. After the visual angle compensation is performed using the method for adjusting the grayscales of the display panel in the above embodiments, the front-viewing gamma curve is basically unchanged, so as to avoid affecting a front-viewing display effect of the display panel.

As shown in FIG. 8, a dotted line represents the target high grayscales, and a solid line represents the initial high grayscales. As shown in FIG. 9, a dotted line represents the target low grayscales, and a solid line represents the initial low grayscales. It can be seen that compared with the initial high grayscales and the initial low grayscales corresponding to the original grayscales, the visual angle compensation makes a distance between a curve of the target high grayscales and a curve of the target low grayscales longer, which means that a visual angle corresponding to the target high grayscale and the target low grayscale is larger than a visual angle corresponding to the initial high grayscale and the initial low grayscale. Therefore, the visual angle improvement effect is effectively improved.

An embodiment of the present disclosure further provides a display panel. The display panel provided in the embodiment of the present disclosure adopts the method for adjusting the grayscales of the display panel as described in any of the above embodiments to obtain the target high grayscales and the target low grayscales corresponding to the original grayscales. Please refer to the above embodiments for details, which will not be described herein.

The display panel provided by the embodiment of the present disclosure may be a large-size liquid crystal display panel. In the present disclosure, through the above method for adjusting the grayscales, under any set target grayscale arrangement, a target high grayscale and a target low grayscale corresponding to an original grayscale can be obtained based on an initial high grayscale and an initial low grayscale corresponding to the original grayscale, thereby increasing visual angles of the display panel, solving visual angle defects, and improving display effects.

It can be understood that for those skilled in the art, equivalent substitutions or changes can be made based on technical solutions and their inventive concepts of the present disclosure, and all such changes or substitutions should fall within the protection scope of the appended claims of the present disclosure.

What is claimed is:

1. A method for adjusting grayscales of a display panel, comprising:

obtaining a plurality of initial high grayscales and a plurality of initial low grayscales corresponding to a plurality of original grayscales;

obtaining a plurality of reference brightness corresponding to the original grayscales according to the initial high grayscales and the initial low grayscales;

setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale;

selecting at least a part of the original grayscales as binding-point grayscales and setting a high grayscale threshold and a front-viewing weight corresponding to each binding-point grayscale;

filtering the initial dataset according to the high grayscale threshold, the initial high grayscales, and the initial low grayscales to obtain a preliminary dataset;

calculating a weight of the preset brightness corresponding to each original grayscale in the preliminary dataset according to the front-viewing weight and the reference brightness; and for one same original grayscale, selecting one group of grayscale data corresponding to the preset brightness with the smallest weight as a target high grayscale and a target low grayscale of the original grayscale.

2. The method according to claim 1, wherein the obtaining of a plurality of initial high grayscales and a plurality of initial low grayscales corresponding to a plurality of original grayscales comprises:

obtaining the initial high grayscale and the initial low grayscale corresponding to each original grayscale according to a front-viewing gamma curve and a side-viewing gamma curve of subpixels of each color of the display panel.

3. The method according to claim 1, wherein the filtering of the initial dataset according to the high grayscale threshold, the initial high grayscales, and the initial low grayscales to obtain a preliminary dataset comprises:

comparing the groups of grayscale data corresponding to each original grayscale with the initial high grayscale and the initial low grayscale, wherein if in one same group of grayscale data, the preset high grayscale is greater than the initial high grayscale, a difference between the preset high grayscale and the initial high grayscale is less than the high grayscale threshold, and the preset low grayscale is less than the initial low grayscale, the group of grayscale data is retained in the preliminary dataset; otherwise, the group of grayscale data is filtered out.

4. The method according to claim 1, wherein the reference brightness comprises a front-viewing reference brightness and a side-viewing reference brightness, the preset brightness comprises a front-viewing preset brightness and a side-viewing preset brightness, and in the calculating of a weight of the preset brightness, the weight of the preset brightness is calculated as: $K=a\times|L3-L1|+(1-a)\times|L4-L2|$, where K represents the weight of the preset brightness, a represents the front-viewing weight, L3 represents the front-viewing preset brightness, L1 represents the front-viewing reference brightness, L4 represents the side-viewing preset brightness, and L2 represents the side-viewing reference brightness.

5. The method according to claim 1, wherein the binding-point grayscales comprise a first binding-point grayscale and a second binding-point grayscale, the second binding-point grayscale is greater than the first binding-point grayscale, and a high grayscale threshold corresponding to the second binding-point grayscale is greater than a high grayscale threshold corresponding to the first binding-point grayscale.

6. The method according to claim 1, wherein the selecting of at least a part of the original grayscales as binding-point grayscales and setting of a high grayscale threshold and a front-viewing weight corresponding to each binding-point grayscale further comprises:

obtaining a high grayscale threshold and a front-viewing weight corresponding to each original grayscale except the binding-point grayscales through interpolation.

7. The method according to claim 1, wherein the selecting of one group of grayscale data corresponding to the preset brightness with the smallest weight as a target high grayscale and a target low grayscale of the original grayscale further comprises:

setting a first preset grayscale, wherein if an Nth original grayscale is greater than the first preset grayscale, a target high grayscale corresponding to the Nth original grayscale is greater than a target high grayscale corresponding to an N-1th original grayscale and less than the target high grayscale corresponding to the N-1th original grayscale plus one, and a difference between a grayscale value of the Nth original grayscale and a grayscale value of the N-1th original grayscale is one.

8. The method according to claim 7, wherein the first preset grayscale is greater than or equal to 150.

9. The method according to claim 1, wherein the selecting of one group of grayscale data corresponding to the preset brightness with the smallest weight as a target high grayscale and a target low grayscale of the original grayscale further comprises:

setting a second preset grayscale, wherein if an Nth original grayscale is greater than the second preset grayscale, a target low grayscale corresponding to the Nth original grayscale is greater than a target low grayscale corresponding to an N-1th original grayscale and less than the highest grayscale among the original grayscales.

10. The method according to claim 1, wherein the obtaining of a plurality of initial high grayscales and a plurality of initial low grayscales corresponding to a plurality of original grayscales further comprises:

correcting the initial high grayscale and the initial low grayscale corresponding to each original grayscale so that the initial high grayscale corresponding to each original grayscale is greater than the initial low grayscale corresponding to each original grayscale.

11. The method according to claim 1, wherein in the target grayscale arrangement, in the display panel, a ratio of a number of subpixels displayed in the preset high grayscales to a number of subpixels displayed in the preset low grayscales is 1:1, 1:2, or 1:3.

12. A non-transitory computer-readable storage medium having stored thereon instructions that, when executed by one or more processors, cause the one or more processors to execute operations comprising:

obtaining a plurality of initial high grayscales and a plurality of initial low grayscales corresponding to a plurality of original grayscales;

obtaining a plurality of reference brightness corresponding to the original grayscales according to the initial high grayscales and the initial low grayscales;

setting a target grayscale arrangement and obtaining an initial dataset according to the target grayscale arrangement, wherein the initial dataset comprises a plurality of groups of grayscale data corresponding to each original grayscale and a preset brightness corresponding to each group of grayscale data, and each group of grayscale data comprises a preset high grayscale and a preset low grayscale;

selecting at least a part of the original grayscales as binding-point grayscales and setting a high grayscale threshold and a front-viewing weight corresponding to each binding-point grayscale;

filtering the initial dataset according to the high grayscale threshold, the initial high grayscales, and the initial low grayscales to obtain a preliminary dataset;

calculating a weight of the preset brightness corresponding to each original grayscale in the preliminary dataset according to the front-viewing weight and the reference brightness; and for one same original grayscale, selecting one group of grayscale data corresponding to the preset brightness with the smallest weight as a target high grayscale and a target low grayscale of the original grayscale.

13. The non-transitory computer-readable storage medium of claim 12, wherein the instructions for the obtaining of a plurality of initial high grayscales and a plurality of initial low grayscales corresponding to a plurality of original grayscales, when executed by the one or more processors, cause the one or more processors to further execute operations comprising:

obtaining the initial high grayscale and the initial low grayscale corresponding to each original grayscale according to a front-viewing gamma curve and a side-viewing gamma curve of subpixels of each color of the display panel.

14. The non-transitory computer-readable storage medium of claim 12, wherein the instructions for the filtering of the initial dataset according to the high grayscale threshold, the initial high grayscales, and the initial low grayscales to obtain a preliminary dataset, when executed by the one or more processors, cause the one or more processors to further execute operations comprising:

comparing the groups of grayscale data corresponding to each original grayscale with the initial high grayscale and the initial low grayscale, wherein if in one same group of grayscale data, the preset high grayscale is greater than the initial high grayscale, a difference between the preset high grayscale and the initial high grayscale is less than the high grayscale threshold, and the preset low grayscale is less than the initial low grayscale, the group of grayscale data is retained in the preliminary dataset; otherwise, the group of grayscale data is filtered out.

15. The non-transitory computer-readable storage medium of claim 12, wherein the reference brightness comprises a front-viewing reference brightness and a side-viewing reference brightness, the preset brightness comprises a front-viewing preset brightness and a side-viewing preset brightness, and in the calculating of a weight of the preset brightness, the weight of the preset brightness is calculated as: $K=a\times|L3-L1|+(1-a)\times|L4-L2|$, where K represents the weight of the preset brightness, a represents the front-viewing weight, L3 represents the front-viewing preset brightness, L1 represents the front-viewing reference brightness, L4 represents the side-viewing preset brightness, and L2 represents the side-viewing reference brightness.

16. The non-transitory computer-readable storage medium of claim 12, wherein the binding-point grayscales comprise a first binding-point grayscale and a second binding-point grayscale, the second binding-point grayscale is greater than the first binding-point grayscale, and a high grayscale threshold corresponding to the second binding-point grayscale is greater than a high grayscale threshold corresponding to the first binding-point grayscale.

17. The non-transitory computer-readable storage medium of claim 12, wherein the instructions for the selecting of at least a part of the original grayscales as binding-point grayscales and setting of a high grayscale threshold and a front-viewing weight corresponding to each binding-point grayscale, when executed by the one or more processors, cause the one or more processors to further execute operations comprising:

obtaining a high grayscale threshold and a front-viewing weight corresponding to each original grayscale except the binding-point grayscales through interpolation.

18. The non-transitory computer-readable storage medium of claim 12, wherein the instructions for the selecting of one group of grayscale data corresponding to the preset brightness with the smallest weight as a target high grayscale and a target low grayscale of the original grayscale, when executed by the one or more processors, cause the one or more processors to further execute operations comprising:

setting a first preset grayscale, wherein if an Nth original grayscale is greater than the first preset grayscale, a target high grayscale corresponding to the Nth original grayscale is greater than a target high grayscale corresponding to an N-1th original grayscale and less than the target high grayscale corresponding to the N-1th original grayscale plus one, and a difference between a grayscale value of the Nth original grayscale and a grayscale value of the N-1th original grayscale is one.

19. The non-transitory computer-readable storage medium of claim 18, wherein the first preset grayscale is greater than or equal to 150.

20. The non-transitory computer-readable storage medium of claim 12, wherein the instructions for the selecting of one group of grayscale data corresponding to the preset brightness with the smallest weight as a target high grayscale and a target low grayscale of the original grayscale, when executed by the one or more processors, cause the one or more processors to further execute operations comprising:

setting a second preset grayscale, wherein if an Nth original grayscale is greater than the second preset grayscale, a target low grayscale corresponding to the Nth original grayscale is greater than a target low grayscale corresponding to an N-1th original grayscale and less than the highest grayscale among the original grayscales.

* * * * *